United States Patent
Krivenok et al.

(10) Patent No.: US 10,037,427 B1
(45) Date of Patent: Jul. 31, 2018

(54) BOOT BLOCKING OF VIRTUAL STORAGE APPLIANCE

(71) Applicant: EMC IP Holding Company LLC, Hopkinton, MA (US)

(72) Inventors: Dmitry V. Krivenok, Saint Petersburg (RU); Yuri A. Stotski, Saint Petersburg (RU); Jared C. Lyon, Brighton, MA (US); Wai C. Yim, Merrimack, NH (US); Brian R. Tetreault, Upton, MA (US); Michael L. Burriss, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 15/142,808

(22) Filed: Apr. 29, 2016

(51) Int. Cl.
| | |
|---|---|
| *G06F 21/57* | (2013.01) |
| *H04L 29/06* | (2006.01) |
| *G06F 9/4401* | (2018.01) |
| *G06F 9/455* | (2018.01) |

(52) U.S. Cl.
CPC .......... *G06F 21/575* (2013.01); *G06F 9/4416* (2013.01); *G06F 9/45558* (2013.01); *H04L 63/102* (2013.01); *G06F 2009/45595* (2013.01)

(58) Field of Classification Search
CPC .............. G06F 21/575; G06F 9/45558; G06F 17/30867; G06F 9/4416; G06F 2009/45595; G06F 2009/45583; H04L 63/102
See application file for complete search history.

(56) References Cited

U.S. PATENT DOCUMENTS

| 8,799,557 B1 * | 8/2014 | Chen | G06F 12/0638 711/103 |
|---|---|---|---|
| 2013/0024857 A1 * | 1/2013 | Yusupov | G06F 9/5077 718/1 |
| 2014/0095693 A1 * | 4/2014 | Apte | H04L 67/1008 709/224 |

* cited by examiner

*Primary Examiner* — Meng Li
(74) *Attorney, Agent, or Firm* — BainwoodHuang (57) ABSTRACT

A method of controlling startup of a virtual storage appliance includes obtaining resource information about virtual resources (e.g., hardware resources) available in a virtual-computing environment of the host computer, and comparing the resource information with resource profiles describing sets of virtual resources compatible with resource needs of the virtual storage appliance. A comparison result is used to selectively enable or disable remaining startup of the virtual storage appliance, the remaining startup being enabled when the resource information matches one of the resource profiles, and being disabled when resource information does not match any of the resource profiles. A user may be notified using a reporting mechanism, and the virtual machine may be placed into a service mode that includes facilities for examining configuration and other information to determine the cause of a mismatch.

20 Claims, 5 Drawing Sheets

BOOT BLOCKING OF VIRTUAL STORAGE APPLIANCE

BACKGROUND

The present invention is related to the field of virtual computing, i.e., systems employing virtualization technology to deploy applications on software-defined "machines" referred to as "virtual machines". In particular, the invention relates to specialized virtual machines providing data storage, referred to herein as "virtual storage appliances" or VSAs.

SUMMARY

A virtual storage appliance or VSA is a software-implemented component executed in a virtualized environment to provide virtualized data storage resources to other system elements, such as other VMs executing application software for example. From the perspective of the rest of the system, a VSA resembles its purpose-built, dedicated-hardware counterpart, such as a network attached storage (NAS) box or an integrated cached disk array (ICDA). The VSA relies on a virtualizer such as a hypervisor to support both the required interfaces (e.g., storage-oriented network interfaces and device interfaces) and virtual "raw" storage (supported by underlying real physical storage devices) on which the VSA builds more complex and feature-rich storage objects for presentation to the rest of the system.

In some cases, the software image executed to realize a VSA can be essentially the same one used in a purpose-built data storage device, with suitable modification or configuration to accommodate the virtual environment. The, the VSA image is analogous to an application that may be executed on a variety of virtual-computing platforms. This aspect of virtualizing a data storage appliance may present issues. In a purpose-built deployment, the operating software executes in a well-defined hardware environment generally under the control of the vendor of the software. In contrast, a VSA may be deployed in a wide variety of virtual environments, and in general it may not be possible to assume proper configuration of the virtual machines on which they are deployed. By its nature a VSA has special requirements beyond those of generic virtual machines, in order to satisfy specifications of reliability, consistency, etc. These special requirements may clash with the more variable and generally less stringent approach that a user might bring to configuring resources of a general-purpose virtual machine. If a VSA is executed on a VM whose configuration does not correspond to the requirements of the VSA, then the VSA may operate improperly (e.g., out of specification) or perhaps not at all.

Disclosed are methods and apparatus that provide for validation of the virtualization environment for a VSA, carried out during initial startup or "booting". Such validation includes checking for presence and capabilities of virtual hardware and other (possibly environment-specific) checks. If the environment validation checking fails, the boot of the VSA is blocked and a user is notified to resolve the issue.

More particularly, a method is disclosed of controlling startup of a virtual storage appliance executed as a virtual machine on a host computer. The method includes obtaining resource information about virtual resources available to the virtual storage appliance in a virtual-computing environment of the host computer. In one embodiment the resource information includes information about hardware resources such as CPU, memory, storage, etc.

The resource information is compared with one or more predetermined resource profiles stored as part of the virtual storage appliance. The resource profiles describe respective sets of virtual resources each compatible with resource needs of the virtual storage appliance during normal post-startup operation. The comparing produces a comparison result.

The comparison result is used to selectively enable or disable remaining startup of the virtual storage appliance. The remaining startup is enabled when the comparison result indicates that the resource information matches one or more of the resource profiles, and is disabled when the comparison result indicates that the resource information does not match any of the resource profiles. Additionally, a user may be notified using a reporting mechanism, and in one embodiment the virtual machine is placed into a service mode that includes facilities for examining configuration and other information to determine the cause of the mismatch. Once a mismatch is identified, it can be corrected and then the VSA can be booted again to begin normal operation.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
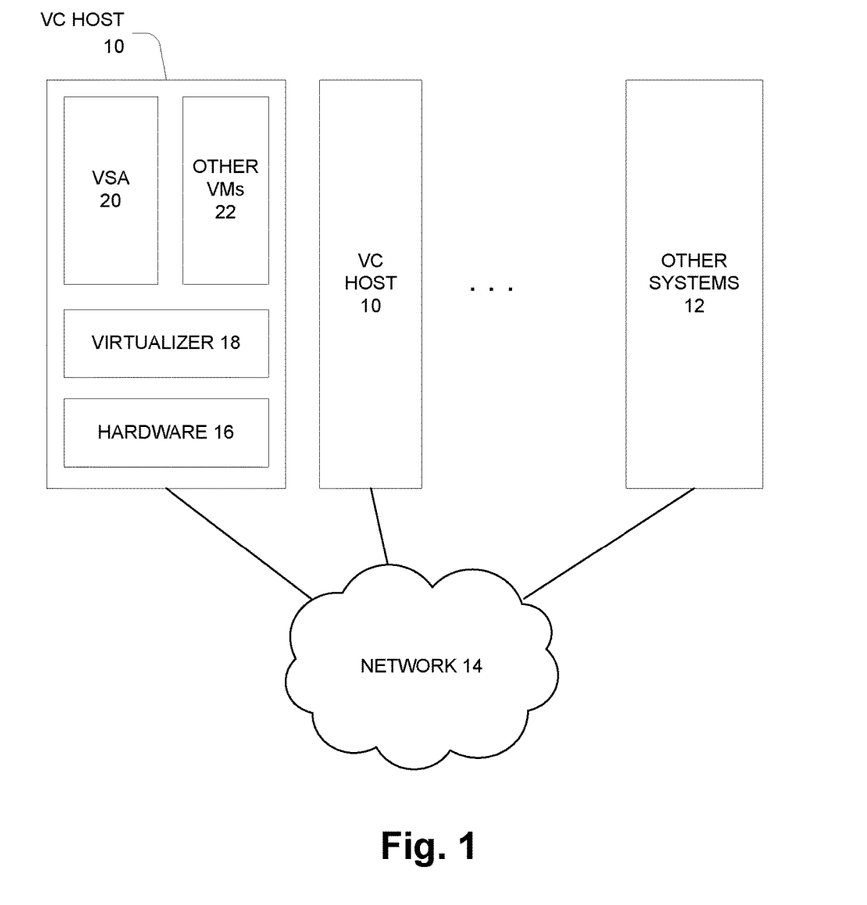
FIG. 1 is a block diagram of a computer system.

FIG. 1 shows a computing system including specialized host computers shown as virtual computing (VC) hosts 10 and other systems 12 interconnected by a network 14. As shown, a VC host 10 includes hardware 16 such as processors, memory, interface circuitry etc. as generally known, and software-implemented components including a virtualizer 18 and virtual machines (VMs) shown as a virtual storage appliance (VSA) 20 and other VMs 22. The other VMs 22 may include additional VSAs 20, and/or VMs configured for other dedicated or general purposes, such as network appliances, specialized application servers such as database servers, etc. The other systems 12, when present, may include specialized components such as data storage systems, network devices, application-specific components for supporting specific deployments, etc.

The virtualizer 18 of the VC host 10 provides an operating environment presenting abstracted or "virtual" resources to the VMs 20, 22 using real resources of the hardware 16 and other physical system components, such as the network 14 and other systems 12. In one class of VC host 10, the virtualizer 18 is realized using a hypervisor, which is generally understood as interfacing directly with the hardware 16 without intermediation by a separate host operating system. Other classes of VC hosts 10 employ other configurations.

The VSA 20 is a software-implemented data storage appliance, analogous to conventional standalone hardware storage appliances such as network attached storage (NAS) boxes, integrated cached disk arrays (ICDAs), etc. In one type of embodiment, the VSA 20 is implemented using a software image also usable to realize such dedicated hardware storage appliances, which is referred to herein as the "dedicated" or "purpose-built" environment in contrast to the "virtual" or "general-purpose" environment that is the primary subject of this description. The VSA 20 uses underlying raw storage resources to present value-added storage to applications executing in the system. Value-added services can cover a broad range including RAID, data deduplication, compression, clustering and failover, etc. Thus the VSA 20 is a consumer of lower-level storage resources such as plain virtual disks, and a provider of higher-level storage resources to applications executing in the system.

Physical data storage needs of the system are generally provided by some combination of so-called "direct attached" storage at the VC hosts 10 and network-accessed storage such as purpose-built storage appliances (NAS, ICDAs, etc.) that may be included in other systems 12. In particular, the virtualizer 18 is responsible for understanding the physical storage resources available in the system and using the storage resources to provide virtual storage to the VSA 20.

As explained above, a VSA 20 may be deployed in a wide variety of virtual environments, and in general it may not be possible to assume proper configuration of the virtual machines on which they are deployed. By its nature a VSA has special requirements beyond those of generic virtual machines, in order to satisfy specifications of reliability, consistency, etc. These special requirements may clash with the more variable and generally less stringent approach that a user might bring to configuring resources of a general-purpose virtual machine. If a VSA 20 is executed on a VM whose configuration does not correspond to the requirements of the VSA, then the VSA may operate improperly (e.g., out of specification) or perhaps not at all.

Thus the present description is focused primarily on aspects of system operation that detect and respond to such potential mismatches, and in particular to methods and apparatus that provide for validation of the virtualization environment for a VSA, carried out during initial startup or "booting". Such validation includes checking for presence and capabilities of virtual hardware and other (possibly environment-specific) checks. If the environment validation checking fails, the boot of the VSA is blocked and a user is notified to resolve the issue. These operations are described in more detail further below.

Figure 2:
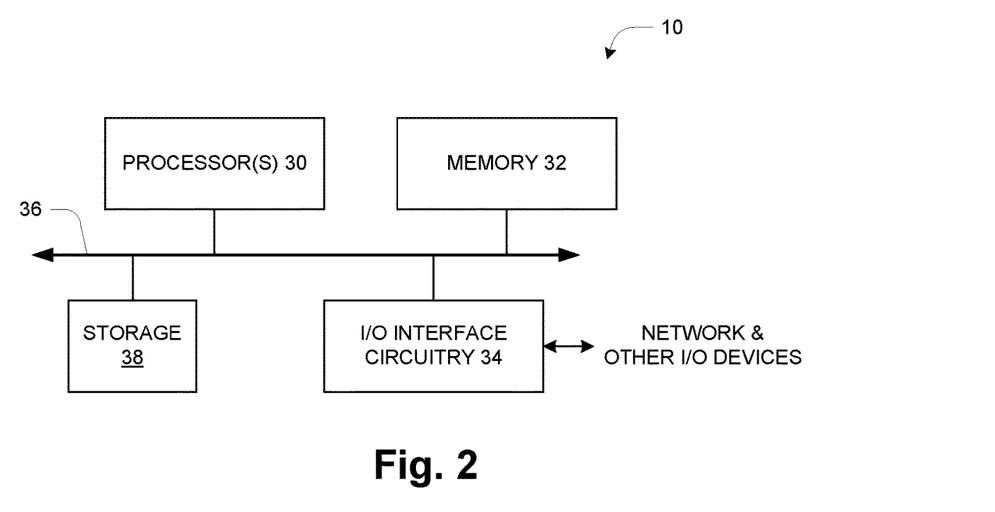
FIG. 2 is a hardware-oriented block diagram of a computer.

FIG. 2 shows an example configuration of a VC host 10 from a computer hardware perspective. The hardware includes one or more processors 30, memory 32, and interface circuitry 34 interconnected by data interconnections 36 such as one or more high-speed data buses. The interface circuitry 34 provides a hardware connection to the network 12 (FIG. 1) and perhaps other external devices/connections (EXT DEVs). The processor(s) 30 with connected memory 32 may also be referred to as "processing circuitry" herein. As mentioned, there may also be local or direct-attached storage 38 such as local-attached disk drives or Flash drives. In operation, the memory 32 stores data and instructions of system software (e.g., operating system, hypervisor, etc.) and one or more application programs which are executed by the processor(s) 30 to cause the hardware to function in a software-defined manner.

Figure 3:
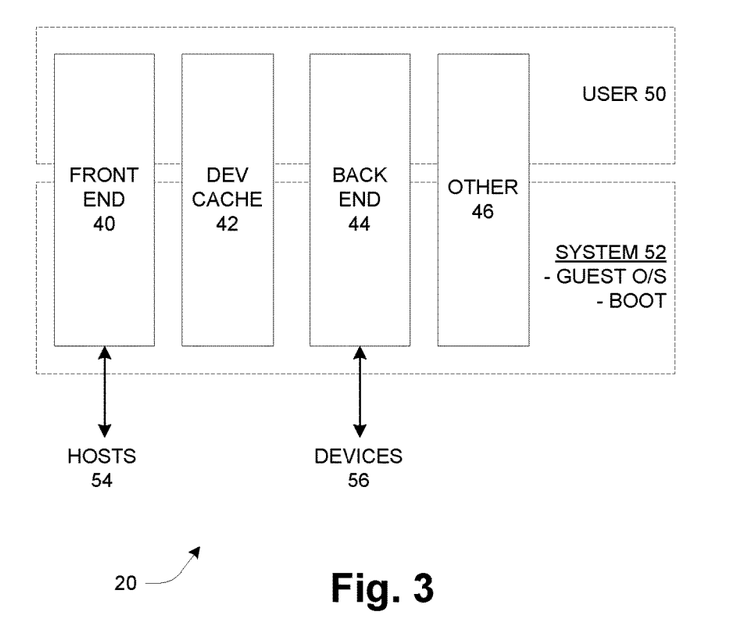
FIG. 3 is a schematic describing organization of a virtual storage appliance (VSA)

FIG. 3 shows a configuration of a VSA 20. It includes a variety of software-implemented components shown as a front end 40, device cache 42, back end 44, and other 46. These components collectively provide the above-described value-added storage functionality of the VSA 20. Each component has sub-components or modules divided between user space 48 and system space 50, which refers to a local operating environment provided by a guest operating system (O/S) for example. System space 50 also includes bootstrap or "boot" modules, the structure and function of which are described more below.

Generally, the front end 40 provides functionality for desired interface(s) to the hosts 54, for example supporting a block-based communications protocol such as iSCSI or a NAS protocol such as CIFS. It may also implement virtual-storage oriented protocols. The front end 40 uses internal mechanisms to realize the underlying functionality. One of the internal mechanisms may be the device cache 42, which caches data of underlying storage devices accessed via the back end 44 to make the data more quickly available, increasing performance. The back end 44 interfaces to the storage resources, such as virtual disks, provided by the virtualizer 18. These storage resources are shown as "devices" 56 in FIG. 3. The other components 46 include things like management and service components, general 0/S components or libraries, and utilities.

The component software of the VSA 20 resides in an executable file referred to as a "VSA image" herein. The virtualizer 18 is responsible for creating a VM instance for the VSA 20 and then loading and launching the VSA image to bootstrap the VSA 20 into operation. Such startup operations for VMs are generally known in the art. As outlined above, because of the increased risk of mismatch between the resource and configuration needs of the VSA 20 and the virtual environment provided by the virtualizer 18, the VSA 20 boot components include "boot blocking" functionality that checks the virtual environment for compatibility during an early part of startup and selectively blocks or aborts startup if the virtual environment does not match the needs of the VSA 20. Details of structure and operation are given below.

Figure 4:
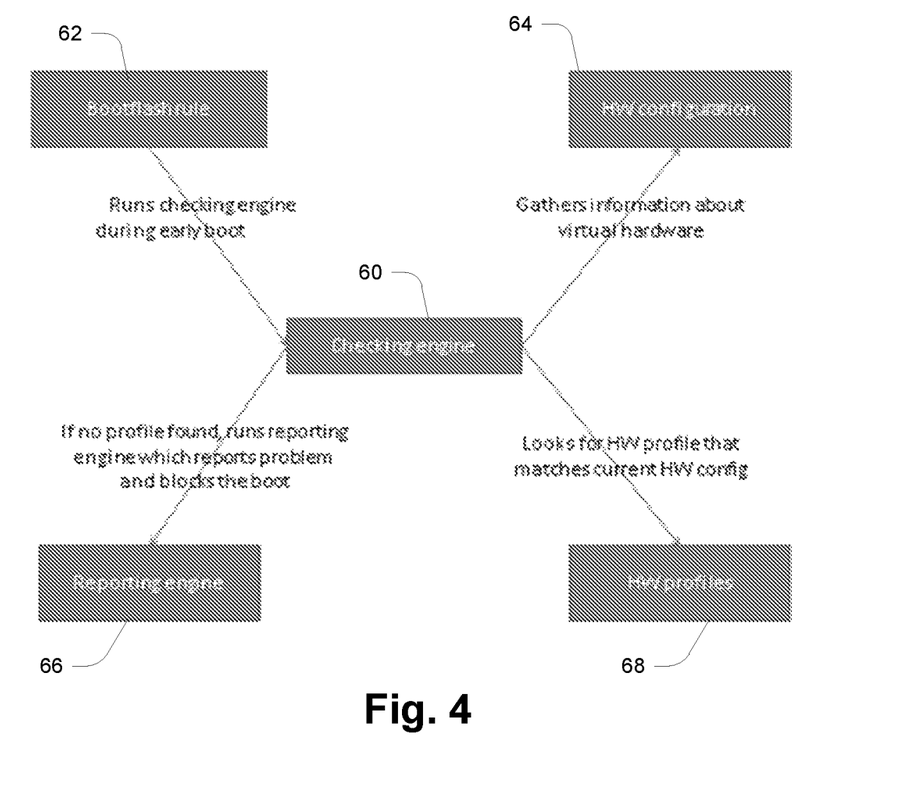
FIG. 4 is a diagram showing boot-related components of a VSA.

FIG. 4 shows components related to startup or "booting" of the VSA 20. These components, which are part of the other components 46, include a checking engine 60, a bootflash rule 62, hardware (HW) configuration 64, reporting engine 66 and HW profiles 58. These components collectively implement the above-mentioned "boot blocking" functionality. The checking engine 60 provides the primary logic and control, and its operation is initiated by the bootflash rule 62 which is executed during bootstrap. The use of a bootflash rule 62 enables the startup code to support both a virtualized deployment such as shown in FIG. 1 and the dedicated or purpose-built deployment with customized hardware. In a purpose-built deployment, the hardware platform is specifically designed to function as a data storage device and generally provides only configurations that satisfy the needs of the resident operating software. In this case, boot blocking is unnecessary, and the bootflash rule 62 detects the purpose-built configuration and refrains from initiating boot blocking. When the bootflash rule 62 detects the virtualized configuration as depicted in FIG. 1, it initiates the boot blocking operation during startup.

Thus an entry point into the boot blocking process is the bootflash rule 62 which should be executed very early. It is incorporated into the VSA boot process with the following considerations:

It should be VSA-specific; there is no need to run the rule in a physical deployment of the VSA image (on purpose-built hardware)

It shouldn't run before the guest O/S finishes configuration of hardware devices, otherwise tools used to gather HW configuration information may not work It should run before other VSA components that might detect problems with hardware. For example, it should run before a memory hot-plug component is allowed to run, in order to detect whether the amount of installed memory is insufficient (in which case the hot-plug component might fail)

It should not run before the VSA can provide reliable service mode

As shown in FIG. 4, the bootflash rule 62 runs the checking engine 60, during early boot as described above. The checking engine interrogates the HW configuration 64 to gather information about the virtual hardware/resources provided by the virtualizer 18, and also interrogates the HW profile 68 to determine which configurations or profiles of hardware/resources are supported by the VSA 20. The HW profiles 68 are stored as part of the VSA image. The checking engine 60 compares the resource information from the HW configuration 64 to the profiles from the HW profiles 68 to determine whether the provided resources match any of the profiles. If so, then the virtual environment is deemed to comply with the needs of the VSA 20, and the VSA 20 is permitted to startup. Otherwise, the virtual environment is deemed as non-compliant and the VSA 20 is not permitted to startup. In this case, the checking engine 60 invokes the reporting engine 66 to report the boot blocking to a system user, and may invoke a management or service component as described more below.

The HW configuration component 64 should provide a unified interface to actual virtual hardware visible by the VSA 20. It should only provide information relevant for boot blocking decisions (e.g. number of CPUs, amount of RAM, etc.).

The HW profiles 68 define valid configurations. There may be one or more profiles defined for the product. In case at least one matching profile is found, boot continues as normally. Otherwise, boot is blocked.

The reporting engine 66 reports the reason for blocked boot and may actually accomplish the blocking by invoking methods provided by the virtualizer 18.

Figure 5:
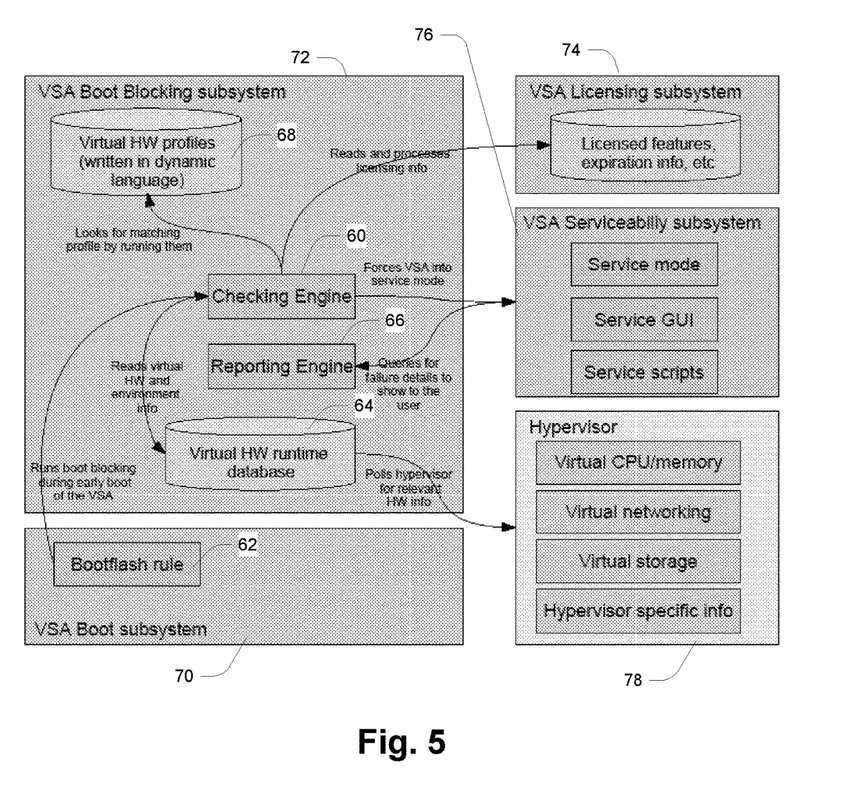
FIG. 5 is a diagram showing relationships and use of the boot-related components in connection with other components.

FIG. 5 illustrates structure and functioning of the startup-related components of FIG. 4 as well as related components. Major groupings include a VSA boot subsystem 70, VSA boot blocking subsystem 72, VSA licensing subsystem 74, VSA serviceability subsystem 76, and the virtualizer 18 which is shown as hypervisor 78. The VSA boot subsystem 70 includes the bootflash rule 62. The VSA boot blocking subsystem 72 includes the checking engine 60, HW configuration 64, reporting engine 66, and HW profiles 68. Both the HW configuration 64 and HW profiles 68 are shown as respective databases. The HW configurations 64 are maintained by obtaining information from the hypervisor 78.

The VSA serviceability subsystem 76 supports a service mode of operation, including a related GUI and scripts. When the checking engine 60 detects a mismatch between the HW configuration and the supported HW profiles, it invokes the VSA serviceability subsystem 76 to enter service mode, where action may be taken to address the mismatch for example. The VSA serviceability subsystem also provides information to the reporting engine 66 regarding the details of the boot failure, e.g., the details of the mismatch, for reporting to a service user.

Figure 6:
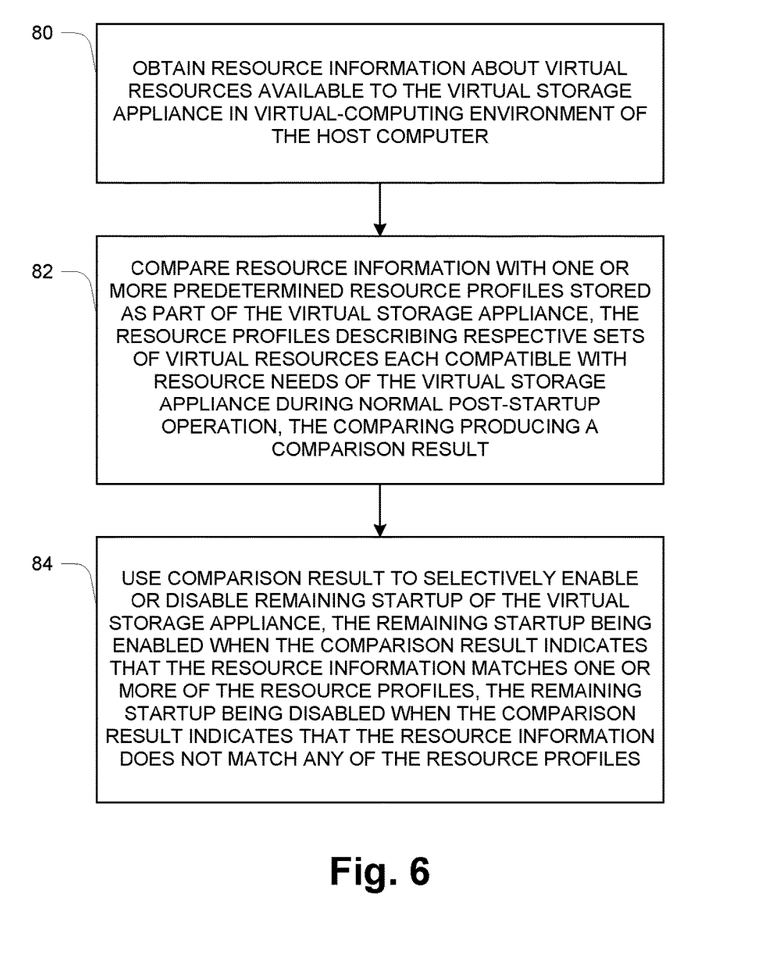
FIG. 6 is a flow diagram of a boot blocking process.

FIG. 6 is a high-level flow diagram of pertinent operation, specifically as it relates to controlling startup of a VSA such as VSA 20. In one example, this flow is initiated by operation of the bootflash rule 62.

At 80, resource information is obtained about virtual resources available to the virtual storage appliance in a virtual-computing environment of the host computer. In one example, this is performed by the checking engine 60 interrogating the HW configuration 64 as described above.

At 82, the resource information is compared with one or more predetermined resource profiles stored as part of the virtual storage appliance. The resource profiles describe respective sets of virtual resources each compatible with resource needs of the virtual storage appliance during normal post-startup operation, and the comparing produces a comparison result. In one example, this is performed by the checking engine 60 interrogating the HW profiles 68 and then comparing these with the HW configuration 64 to look for one or more matches.

At 84, the comparison result is used to selectively enable or disable remaining startup of the virtual storage appliance. Remaining startup is enabled when the comparison result indicates that the resource information matches one or more of the resource profiles, and remaining startup is disabled when the comparison result indicates that the resource information does not match any of the resource profiles. In one example, this selective enabling/disabling is performed by the checking engine 60. As mentioned above, when remaining startup is disabled, operation may instead proceed to a service mode such as provided by the VSA serviceability subsystem 74.

Hardware Configuration

The HW configuration component 64 provides a standardized interface to a subset of actual hardware configuration relevant to boot blocking. That interface is used by the checking engine 60 while searching for a matching hardware profile.

Facilities of the guest O/S (e.g., Linux kernel) and/or utilities available in the bootflash can be used to gather almost all necessary information about presence and capabilities of virtual hardware. In many cases, the following four distinct classes of hardware resources are relevant:

1. CPU

Information about the CPU is obtained via VSA base OS mechanisms and tools. In one example, Linux provides a /proc/cpuinfo interface to get information about the CPU. The hardware configuration interface may provide at least the following information:

Number of CPU cores
CPU frequency and instruction-per-second (IPS) rate
CPU capabilities (flags)
CPU topology info
CPU model name
CPU cache size 2. Memory Information about system RAM is obtained via VSA base OS mechanisms and tools, such as DMI tables in a Linux environment. The HW configuration interface should report at least the total amount of RAM available. Additionally, memory topology information may be reported.

3. Network Interfaces

Information about network interfaces is obtained via VSA base OS mechanisms and tools. The HW configuration interface may provide the following information:

Total number of network interfaces (NICs)
Number of data NICs
NIC speed and status (per NIC and aggregate requests)

4. Storage

VSA boot blocking decisions may be made based on available storage (both system storage and storage objects for virtual logical units). The interface may be able to report:

Number of system disks
Number of data disks (DAS storage objects)
Size and capabilities of each disk Hardware Profiles Hardware profiles describe minimal hardware configuration requirements. Hardware profile is basically a set of conditions with single Boolean result. Below is an example of simple profile.

RESULT=(RAM==24 Gb)&&(CPUs==4)

In this example, configuration is considered valid if amount of RAM is equal to 24 Gb and number of CPUs is equal to 4. Real profiles may be much more complicated, but conditions are limited to well-defined hardware configuration interface.

Physical Representation

Hardware profiles 68 may be represented as simple configuration files containing the information, such as:

RAM=24

CPU_COUNT=4

DATA_NICS=2|| DATA_NICS=4

This format, however, requires explicit parsing and may not scale well as complexity of conditions increases.

An alternative approach is to write profiles in some dynamic language, e.g. Perl. Below is an example of hardware profile expressed as Perl script.

$profile_name='UnityVSA (12 GB RAM, 2 cores)';

$profile_matched=1;

Exactly 12 GB of RAM check_ram($profile_name, $virtual_hw, 12*1024) or $profile_matched=0;

Exactly 2 logical cores, don't care about underlying topology check_cpu($profile_name, $virtual_hw, 2) or $profile_matched=0;

6 or 9 NICs total my $nic_count=$virtual_hw->get_pci_device_count (qr/Ethernet controller/);

check($profile_name, $nic_count==6|| $nic_count==9, "Expected either 6 or 9 Ethernet adapters, but detected %d", $nic_count) or $profile_matched=0;

Only 4 data NICs (all four are 1 Gb or 10 Gb, but not mixed)

my $expected_data_nic_count=4;

check_data_nic($profile_name, $virtual_hw, $expected_data_nic_count) or $profile_matched=0;

This approach requires the hardware configuration object to be available in the script via a well-known name. The script may be evaluated by the checking engine without the need to do any parsing; the result will be available via a Boolean variable defined in the caller's context. This method is much more flexible.

Single Profile vs. Multiple Profiles

A system may support more than one valid configuration for the same VSA image (e.g. 2/12 or 4/24). Although it may be technically possible to use a single hardware profile for all possible configurations, this may lead to very complicated conditional logic. Instead, multiple hardware profiles may be used, one for each supported configuration.

Per-Resource Conditions

One drawback of having single Boolean result of profile matching is that it may not be possible to identify a specific resource that caused a mismatch (e.g. amount of RAM or number of CPUs). This can be solved by introducing per-resource conditions in hardware profiles or adding new interfaces in checking engine.

One important note here is that in some embodiments the resources may not be considered independently. For example, the amount of RAM may depend on the number of CPUs. In other embodiments such constraints may be fewer or absent altogether.

It should be noted that virtual hardware configuration is not the only resource information that can be used for boot blocking decisions. In other cases, there may be dependencies in operating software that may not be satisfied in all deployments. For example, either user-level code or system-level code of an operating component, or even a guest VM, may be incompatible with certain operation or requirements of the virtualization layer 18, which could lead to incorrect operation or even failure if normal operation is permitted to occur. The present description focuses on hardware configuration as a primary example. In alternative embodiments, other sources may be used instead of or in addition to hardware configuration information.

Reporting Engine

In case no hardware profile matches current the hardware configuration, the problem is reported and the boot of the VSA 20 is blocked.

For reporting, one generic approach that doesn't depend on specific virtual environment is to go into service mode. If the checking engine 60 detects an invalid configuration, the reporting engine 66 increments a software boot counter, sets a service hint, and forces the VM into service mode.

When VSA goes into service mode, the user is provided with a set of serviceability tools which allow the user to understand which boot counters caused the issue, get detailed information on boot blocking reasons and also move VSA out of service mode when the problem is resolved.

An alternative approach is to use hypervisor-specific reporting capabilities. In this case, an event or change state for the VSA virtual machine is generated and it is powered off. An external management interface may be used to obtain details of the failure.

Checking Engine

As described above, the checking engine 60 is a key component of the boot blocking process which interacts with all other components. Its main responsibility is to obtain the hardware configuration and verify that it is valid using available hardware profiles. If the configuration is not valid, the checking engine 60 calls the reporting engine 66 to report the problem and block the boot.

The boot blocking mechanism described herein is applicable not only to virtual storage appliances but more broadly to virtual machines that provide some service and have critical resource needs (e.g., network, memory etc. configuration).

While various embodiments of the invention have been particularly shown and described, it will be understood by those skilled in the art that various changes in form and details may be made therein without departing from the scope of the invention as defined by the appended claims.

What is claimed is:

1. A method of controlling startup of a virtual storage appliance (VSA) executed as a virtual machine on a host computer, comprising:
   obtaining resource information about virtual resources available to the virtual storage appliance in a virtual-computing environment of the host computer;
   comparing the resource information with one or more predetermined resource profiles stored as part of the virtual storage appliance, the resource profiles describing respective sets of virtual resources each compatible with resource needs of the virtual storage appliance during normal post-startup operation, the comparing producing a comparison result;
   using the comparison result to selectively enable or disable remaining startup of the virtual storage appliance, the remaining startup being enabled when the comparison result indicates that the resource information matches one or more of the resource profiles, the remaining startup being disabled when the comparison result indicates that the resource information does not match any of the resource profiles,
   wherein the virtual resources are hardware resources utilized by the VSA during operation, and the resource information includes information about CPUs, memory, network interfaces, and storage,
   the method being configured to be performed at a time satisfying the following:
      1) not before a quest operating system finishes configuration of hardware devices;
      2) before execution of other VSA components capable of detecting problems with hardware devices.

2. The method of claim 1, wherein the virtual storage appliance includes boot-level components co-operating to perform the obtaining, comparing and using steps, the boot-level components including a checking engine that obtains the resource information from a configuration database of the VSA and compares the resource information with the resource profiles, and a reporting engine initiated by the checking engine when the comparison result indicates that the resource information does not match any of the resource profiles.

3. The method of claim 2, wherein the boot-level components include a bootflash rule that detects the virtual-machine execution of the virtual storage appliance and responds by initiating operation of the checking engine.

4. The method of claim 1, further including, when the comparison result indicates that the resource information does not match any of the resource profiles, reporting the comparison result to a system user for remedial action.

5. The method of claim 1, further including, when the comparison result indicates that the resource information does not match any of the resource profiles, entering a service mode of operation usable to diagnose a cause for the comparison result.

6. The method of claim 5, configured to be performed no earlier than when the virtual storage appliance can provide reliable service mode.

7. The method of claim 1, further including, by a bootflash rule included in the VSA, detecting the virtual-machine execution of the virtual storage appliance and responding by initiating operation of the checking engine.

8. The method of claim 7, wherein software of the VSA is also executable in a purpose-built environment having risk that available resources will not meet the resource needs of the software, and wherein the bootflash rule is further operative to detect execution in the purpose-built environment and respond by refraining from initiating operation of the checking engine.

9. The method of claim 1, wherein the other VSA components include a memory hot-plug component whose operation fails if an amount of installed memory is insufficient.

10. The method of claim 1, wherein the information about CPUs, memory, network interfaces, and storage includes number of CPU cores, total amount of memory available, total number of network interfaces, and respective numbers, sizes and capabilities of system disks and data disks.

11. A non-transitory computer-readable medium storing computer program instructions, the instructions being executable by a host computer to cause the host computer to perform a method of controlling startup of a virtual storage appliance (VSA) executed as a virtual machine on the host computer, the method comprising:
   obtaining resource information about virtual resources available to the virtual storage appliance in a virtual-computing environment of the host computer;
   comparing the resource information with one or more predetermined resource profiles stored as part of the virtual storage appliance, the resource profiles describing respective sets of virtual resources each compatible with resource needs of the virtual storage appliance during normal post-startup operation, the comparing producing a comparison result;
   using the comparison result to selectively enable or disable remaining startup of the virtual storage appliance, the remaining startup being enabled when the comparison result indicates that the resource information matches one or more of the resource profiles, the remaining startup being disabled when the comparison result indicates that the resource information does not match any of the resource profiles,
   wherein the virtual resources are hardware resources utilized by the VSA during operation, and the resource information includes information about CPUs, memory, network interfaces, and storage,
   the method being configured to be performed at a time satisfying the following:
      1) not before a guest operating system finishes configuration of hardware devices;
      2) before execution of other VSA components capable of detecting problems with hardware devices.

12. The non-transitory computer-readable medium of claim 11, wherein the virtual storage appliance includes boot-level components co-operating to perform the obtaining, comparing and using steps, the boot-level components including a checking engine that obtains the resource information from a configuration database of the VSA and compares the resource information with the resource profiles, and a reporting engine initiated by the checking engine when the comparison result indicates that the resource information does not match any of the resource profiles.

13. The non-transitory computer-readable medium of claim 12, wherein the boot-level components include a bootflash rule that detects the virtual-machine execution of the virtual storage appliance and responds by initiating operation of the checking engine.

14. The non-transitory computer-readable medium of claim 11, further including, when the comparison result indicates that the resource information does not match any of the resource profiles, reporting the comparison result to a system user for remedial action.

15. The non-transitory computer-readable medium of claim 11, further including, when the comparison result indicates that the resource information does not match any of the resource profiles, entering a service mode of operation usable to diagnose a cause for the comparison result.

16. The non-transitory computer-readable medium of claim 15, configured to be performed no earlier than when the virtual storage appliance can provide reliable service mode.

17. The non-transitory computer-readable medium of claim 11, further including, by a bootflash rule included in the VSA, detecting the virtual-machine execution of the virtual storage appliance and responding by initiating operation of the checking engine.

18. The non-transitory computer-readable medium of claim 17, wherein software of the VSA is also executable in a purpose-built environment having risk that available resources will not meet the resource needs of the software, and wherein the bootflash rule is further operative to detect execution in the purpose-built environment and respond by refraining from initiating operation of the checking engine.

19. The non-transitory computer-readable medium of claim 11, wherein the other VSA components include a memory hot-plug component whose operation fails if an amount of installed memory is insufficient.

20. The non-transitory computer-readable medium of claim 11, wherein the information about CPUs, memory, network interfaces, and storage includes number of CPU cores, total amount of memory available, total number of network interfaces, and respective numbers, sizes and capabilities of system disks and data disks.

* * * * *